United States Patent

Heffernan et al.

[15] 3,668,666

[45] June 6, 1972

[54] FLYING HEAD ON PANTOGRAPH ASSEMBLY WITH PRESSURE RESPONSIVE WITHDRAWAL

[72] Inventors: Hubert John Heffernan, 316 Forrest Drive, Falls Church, Va. 22046; Charles L. Fontana, 22 Silverspruce Rd., Levittown, Pa. 19056

[22] Filed: Apr. 11, 1969

[21] Appl. No.: 815,350

[52] U.S. Cl. ..................................340/174.1 E, 179/100.2 P
[51] Int. Cl. .................G11b 5/60, G11b 21/12, G11b 21/20
[58] Field of Search ............................340/174.1 E, 174.1 F; 179/100.2 CA, 100.2 P

[56] References Cited

UNITED STATES PATENTS

| | | | |
|---|---|---|---|
| 2,950,354 | 8/1960 | Hohnecker | 179/100.2 |
| 3,060,277 | 10/1962 | Baker et al. | 179/100.2 |
| 3,185,484 | 5/1965 | Burdeno | 179/100.2 |
| 3,308,450 | 3/1967 | Bourdon et al. | 179/100.2 |
| 3,310,792 | 3/1967 | Groom et al. | 179/100.2 |
| 3,329,943 | 7/1967 | Tanguy, Jr. et al. | 179/100.2 |
| 3,401,383 | 9/1968 | Ault | 179/100.2 |
| 3,503,056 | 3/1970 | Vos | 340/174.1 |
| 3,055,987 | 9/1962 | Ricketts | 179/100.2 P |
| 3,180,943 | 4/1965 | Van Oort | 340/174.1 E |
| 3,397,289 | 8/1968 | Pfost et al. | 179/100.2 P |
| 3,453,611 | 7/1969 | Laermer | 179/100.2 P |
| 3,505,744 | 4/1970 | Lichowsky | 340/174.1 E |

*Primary Examiner*—Stanley M. Urynowicz, Jr.
*Assistant Examiner*—Vincent P. Canney
*Attorney*—Schellin and Hoffman

[57] ABSTRACT

A flying transducer head mounting for use with rapidly moving magnetic data storage devices such as drums of discs having a magnetizable surface is disclosed. The disclosed mounting is a pantograph type support for supporting a multiple transducer head pad on which the transducer heads are mounted. The heads are brought into flying position after the data storage device has reached its operating speed. The entire assembly includes circuit means for bringing the heads into flying position and circuitry to provide fail-safe operation.

11 Claims, 7 Drawing Figures

INVENTORS
HUBERT JOHN HEFFERNAN &
CHARLES LOUIS FONTANA

BY Schellin & Hoffman
ATTORNEYS

INVENTORS

HUBERT JOHN HEFFERNAN &
CHARLES LOUIS FONTANA

BY Schellin & Hoffman

ATTORNEYS

INVENTORS
HUBERT JOHN HEFFERNAN &
CHARLES LOUIS FONTANA

BY Schellin & Hoffman
ATTORNEYS

FLYING HEAD ON PANTOGRAPH ASSEMBLY WITH PRESSURE RESPONSIVE WITHDRAWAL

BACKGROUND OF THE INVENTION

Modern computers use data storage devices such as drums or discs that travel at relatively high speeds. The drum or disc has a magnetic surface on which information is recorded at a high density. This information is written on or read from the drum or disc by means of one or more read-write transducer heads. In order to obtain satisfactory operation, the heads must be in close proximity, one one-thousandth of an inch or preferably closer, to the recording surface. However, it is desirable that the heads do not touch the recording surface. Contact with the recording surface will cause undesirable wear of the head and the recording surface, and in some instances can irreparably damage the recording surface. Since this type of storage device is quite expensive and not readily replaced, damage to the recording surface must be prevented. Furthermore, contact of the head with the recording surface should be avoided because such contact can cause amplitude distortion of the playback signal which in turn can cause a loss of information.

While various types or head mounting arrangements are known in the art, assemblies called flying heads or aerodynamic heads or floating heads have generally gained acceptance as being the more desirable type of head assembly for reading from or recording on rapidly moving drums and discs. These heads are called flying heads because they ride on a fluid bearing (air) that is created from the rotation of the storage device. The head rides on this air bearing and, if the system operates correctly, the layer of air will keep the heads off of the recording surface. It is obvious that if the storage device should slow down any appreciable amount this air bearing will be reduced and the head will fall onto the surface of the device, thereby wearing or scarring the recording surface. At the speeds with which these devices travel considerable damage could be done to the recording surface in just a short period of time. Also, if dirt should accumulate on the recording surface or if the device should wobble in any fashion, there is always the danger that the transducer head will crash into the recording surface. These prior art flying head assemblies have proved satisfactory in most instances and are considered to be the preferred type of head assembly to be used with the devices in question. However, our experience has shown that even with the more elaborate available flying head assemblies there is always a danger that the head can crash into the recording surface and cause extensive damage of wear. Because of this fact, extremely hard coatings such as nickel cobalt are being used to avoid damage to the recording surface.

We have invented a highly stable flying head assembly that is fail-safe. The heads are not brought into the flying position until the storage device has reached a safe flying speed. Our invention includes means to sense the speed of rotation of the storage device and means to sense the loading on the transducer heads. If the storage device should slow down below safe flying speed, our transducer head assembly will automatically retract the heads from the flying position to a position safely removed from the recording surface. Also, if the loading should increase on the transducer head for any other reason whatsoever, the head will be brought away from the flying position to a position safely removed from the recording surface. Abnormal loading can be caused by dirt accumulation on the recording surface or the heads or by the contact of the heads with the recording surface. The heads are immediately retracted from the flying position if any abnormal loading on the heads occurs. Furthermore, if an electrical power failure occurs, the heads will automatically be retracted from the flying position. The retraction of the heads is not dependent upon any external power source or in fact any electrical source internal or external.

By providing for fail-safe operation and highly stable operation, extremely hard coatings such as nickel cobalt mentioned above need not be utilized. Thus more flexibility in the selection of the material used for the recording surface is provided. Instead of nickel cobalt, an oxide dispersed in a plastic binder may be used. When selecting a material hardness need no longer be the prime consideration; selection of the material can be based on other physical properties such as ease of handling during the manufacturing process, the lubricating properties of the recording surface, and other physical parameters of the material.

SUMMARY

It is therefore an object of this invention to provide a magnetic transducer head assembly.

It is another object of this invention to provide a flying transducer head mounting.

A further object of this invention is to provide a fail-safe magnetic transducer head assembly.

A still further object of this invention is to provide a transducer head mounting and circuitry that senses the speed of rotation of the magnetic medium.

A still further object of this invention is to provide a transducer head assembly that senses the loading on the transducer head.

A still further object of this invention is to provide means to automatically retract a flying head transducer from the flying position when the loading on the head exceeds a predetermined critical loading.

BRIEF DESCRIPTION OF THE DRAWINGS

The above mentioned and other objects of this invention will become readily apparent from the following detailed description of the invention when read in conjunction with the annexed drawings in which.

Figure 2:
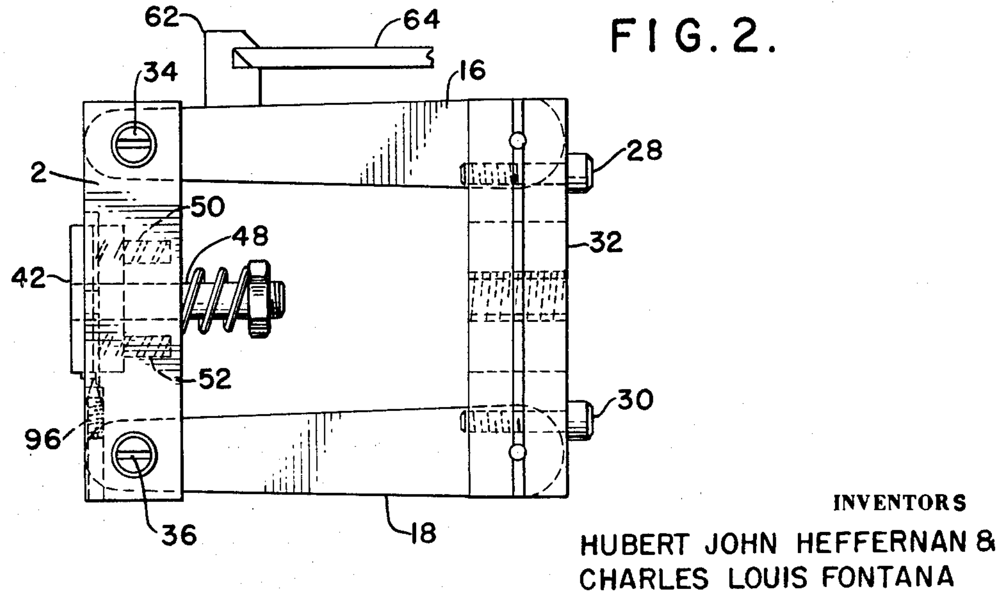
Figures 3, 4, 5:
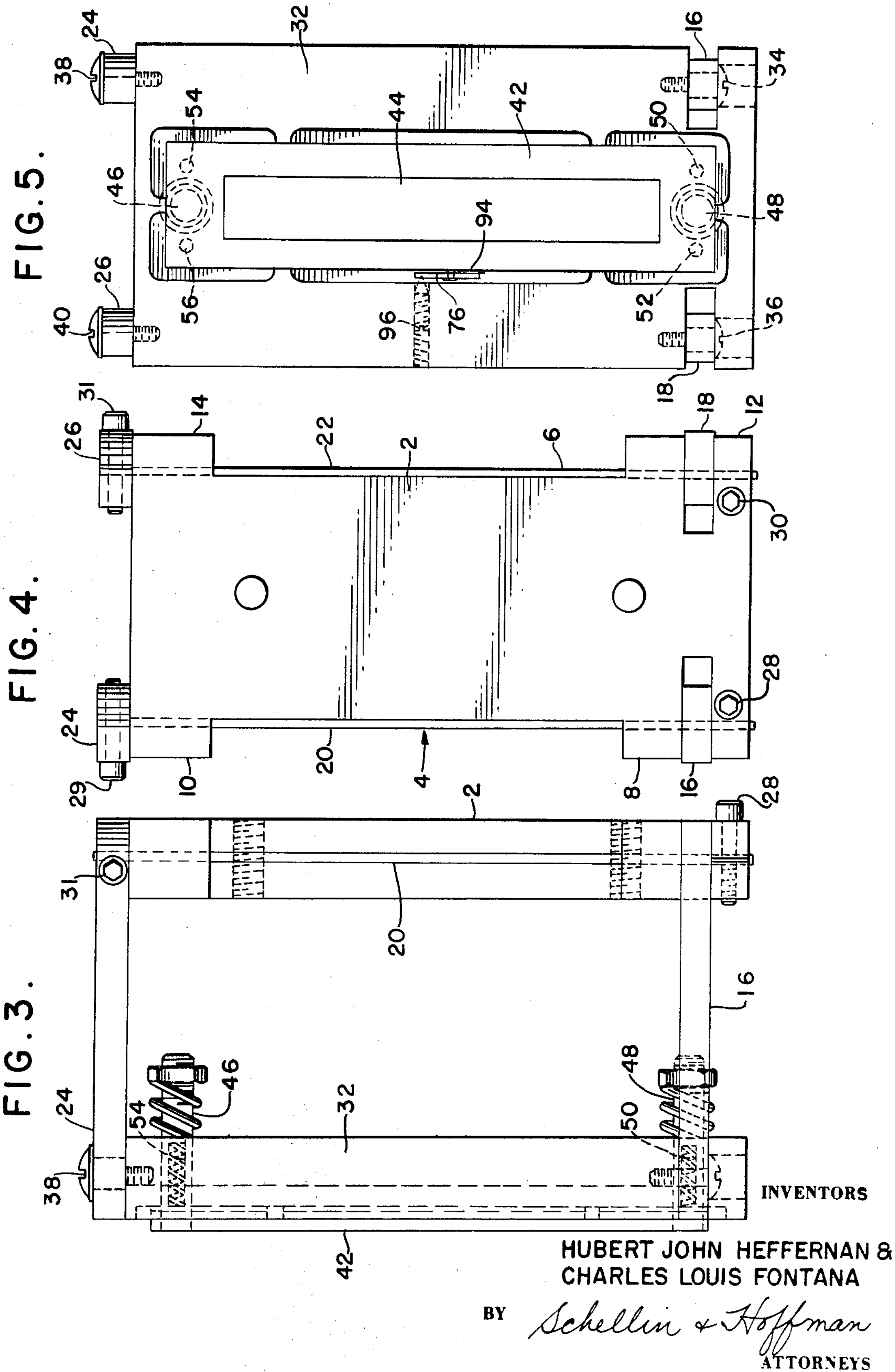

FIG. *1a* is a top view of the assembly with the transducer heads retracted from the flying position;

FIG. 2 is a bottom view of the transducer head mounting in the flying position;

FIG. 3 is a side view of the transducer head mounting;

FIG. 4 is a rear view of the transducer head mounting;

FIG. 5 is a front view of the transducer head mounting; and

Figure 6:
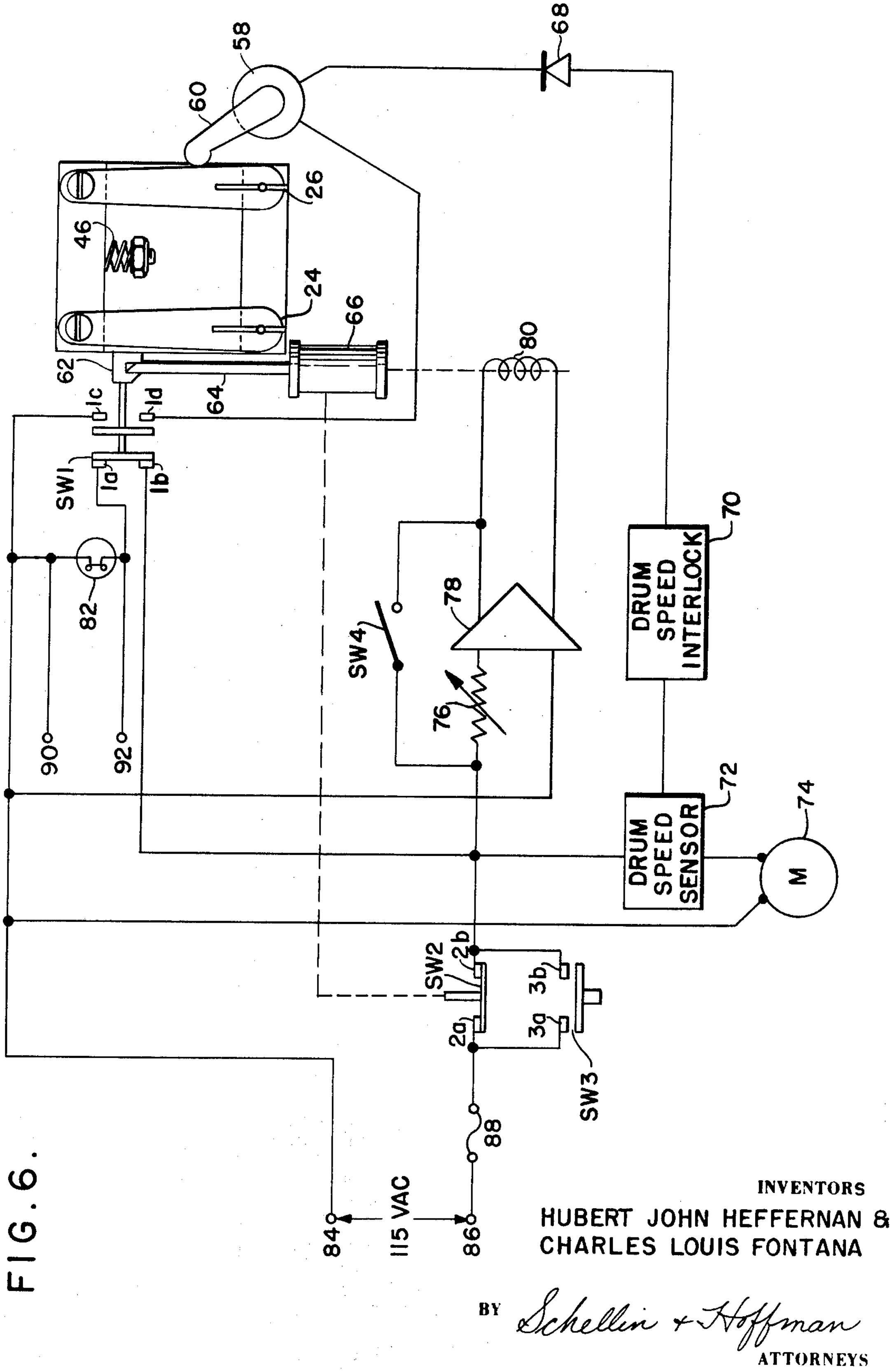

FIG. 6 is a schematic diagram of the electrical circuitry used to control the transducer head mounting.

DESCRIPTION OF THE PREFERRED EMBODIMENT

For ease of description, the following detailed description of the invention will be directed specifically to its use with magnetic drums. However, it is to be remembered that the invention can be used with either magnetic drums, discs or similar storage devices.

Figures 1, 1A:
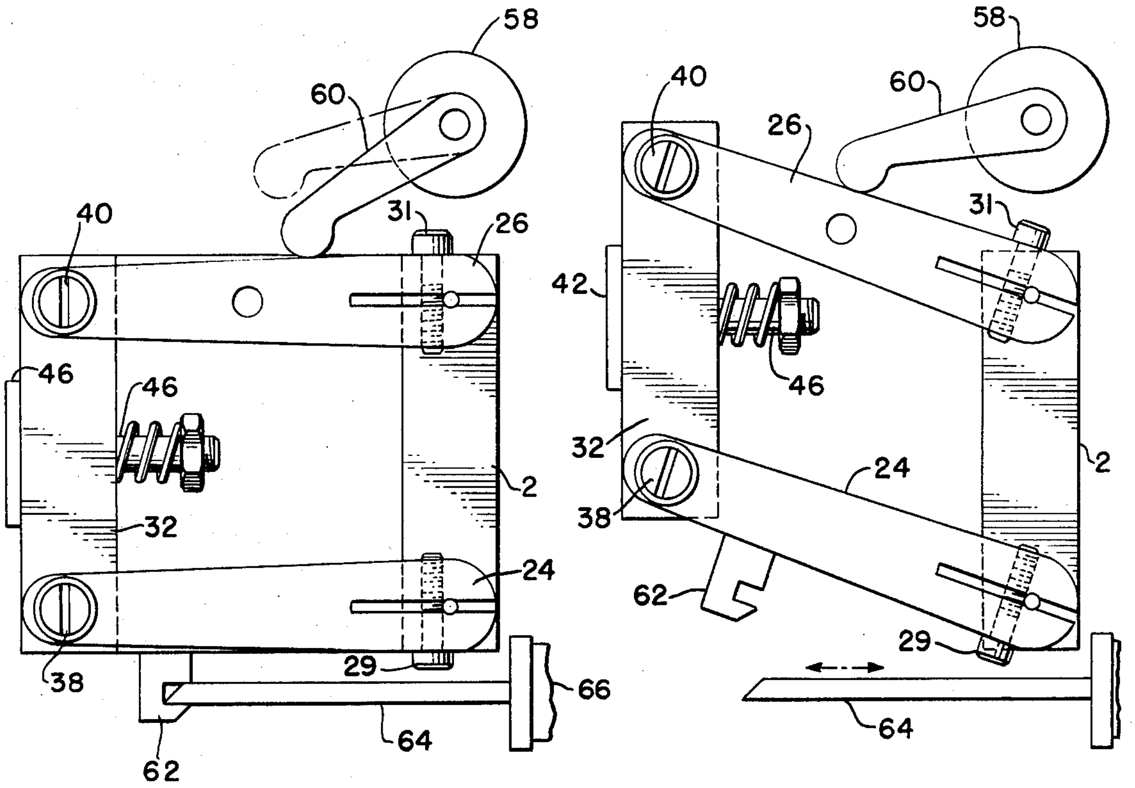
FIG. 1 is a top view of the transducer head mounting in the flying position.

Referring now to the drawing, the transducer mounting comprises a back plate 2 (FIG. 4) made from any suitable metal stock. Plate 2 has a U shaped indentation 4 having the legs 8 and 10 cut out of one side and a U shaped indentation 6 having the legs 12 and 14 cut out of the other side. Notches are cut in the legs 8 and 12 to accommodate cross arms 16 and 18. Actually, the notches are cut deeper than the width of the legs as is apparent in FIG. 4. All four of the legs have holes drilled the full length of the legs. A torsion spring or rod 20 has its ends passing through legs 8 and 10 with the midsection of the rod exposed along indentation 4. Similarly, a torsion spring or rod 22 has its ends passing through legs 12 and 14 with its midsection exposed along indentation 6. The top ends of torsion rods 20 and 22 pass through slits cut into the cross arms 24 and 26, respectively. The rods 20 and 22 are secured in the notches or arms 24 and 26 by means of the screws 29 and 31. The bottom ends of rods 20 and 22 are secured by means of the screws 28 and 30. As will be apparent later, the ends of the torsion rods are secured in the manner just described to keep the ends of the rods from turning. As can be seen in FIG. 2, the bottom of plate 2 is shown as having a slit or groove cut the full width of the plate. This slot is cut in the plate to permit the securing of the ends of rods 20 and 22. Similarly, arms 24 and 26 are notched as shown in FIGS. 1, 1*a* and 4 for the same reason. Of curse, this bottom part of plate 2 could be a separate piece that has been cut in half along its length rather than being an integral part of the plate as shown.

The front of the assembly (FIG. 5) comprises a rectangular plate 32 also made out of suitable metal stock. Notches are cut out of both sides near the bottom of plate 32 to accommodate cross arms 16 and 18 respectively. Cross arms 16 and 18 are held in place by means of screws 38 and 40 respectively. The center of plate 32 is machined or cut out to accommodate transducer head plate 42. Head plate 42 is made out of a thin sheet of metal and has a rectangular hole cut out of the center to provide an opening 44 for the transducer head wiring as will become apparent. Front plate 32 and back plate 2 are connected together at the bottom by means of cross arms 16 and 18 and at the top by means of cross arms 24 and 26. The four cross arms being secured to plates 2 and 32 in the manner described above.

Transducer head mounting plate 42 is secured to front plate 32 by means of the posts 46 and 48 secured by any suitable means to the top and bottom of plate 42 respectively. Holes are drilled through plate 32 so that posts 46 and 48 can extend through the plate 32 as shown. The ends of posts 46 and 48 that pass through the back of front plate 32 are threaded and a spring and nut are placed on each of the posts. Two small springs 50 and 52 are housed in holes drilled into front plate 32 in proximity to the bottom edges of head plate 42. Springs 50 and 52 are under compression. Similarly, two small springs 54 and 56 are housed in holes drilled in front plate 32 in proximity to the top corners of head plate 42 as indicated in FIG. 5. These springs are also under compression.

Transducer heads can be secured directly to head plate 42 by any suitable means such as epoxy cement. Preferably, a ceramic pad on which the transducer heads are mounted is secured to head plate 42 by using a bead of epoxy cement around the edges of plate 42 and the ceramic pad. This ceramic head pad is not shown in the drawing. The wires from the heads extend through the holes cut into head plate 42 and front plate 32 so that the transducer heads can be connected to the appropriate circuitry. Of course head plate 42 could be eliminated and a ceramic head pad could be fastened directly to posts 46 and 48.

By properly adjusting the nuts on posts 46 and 48, the loading on head plate 42 can be either positive, negative or a state of equilibrium can be obtained. Springs 50, 52, 54 and 56 which are under compression tend to push head plate 42 away from plate 32. The spring biased nuts on posts 46 and 48 offset this action of springs 50, 52, 54 and 56. Thus it is obvious that the nuts on posts 46 and 48 can be adjusted such that the action of all the springs is equal thereby obtaining a state of equilibrium or the nuts on posts 46 and 48 can be adjusted to obtain either a positive or negative effect on head plate 42. This differential spring arrangement is an important aspect of the invention since it permits fine adjustment of the head plate and thus the position of the heads. At extremely high bit densities it is desirable to have the heads as close as possible to the recording surface. The nuts on posts 46 and 48 can be adjusted such that the effect of springs 50, 52, 54 and 56 will dominate thereby pushing the heads closer to the recording surface than they would be if the adjustment were such that the effect of the springs were equal and opposite (i.e. equilibrium). This we call positive loading. Of course the exact opposite adjustment could be also made. In this case which we call negative loading, the heads would be held further away than normal from the recording surface; the nuts on posts 46 and 48 being so adjusted that the effect of springs 50, 52, 54 and 56 is more than offset.

From the foregoing description and the drawing it is apparent that transducer head mounting assembly is basically a rectangular box having a front plate 32, a back plate 2 and four horizontal cross arms 16, 18, 24, and 26. The assembly is mounted in close proximity to the magnetic drum surface in such a manner that the transducer heads extend along the axis of the drum. In FIG. 1 the assembly is shown in the flying position. In this position the cross arms 16, 18, 24 and 26 are essentially at right angles to front plate 32 and back plate 2,and the heads are in the operating position. The normal or non-flying position of the assembly is shown in FIG. 1*a*. In this position the cross arms are not at right angles to the front and back plates. Of course, various changes can be made to this basic skeletal structure so long as the basic movement is not changed.

The assembly is brought into the flying position by means of a rotary solenoid 58 and is held in the flying position by means of a latch arrangement consisting of an arm 64 and a notched post 62. Arm 64 locks into the notch in post 62. The notched post 62 is shown as a separate post attached to cross arm 24. While this arrangement can be used, a more desirable arrangement is to have a dimple or notch cut into the back post of front plate 32 in such a manner and in such a position that arm 64 will latch into this dimple or notch. In fact, this arrangement is used on a presently existing working model. However, this dimple or notch arrangement is difficult to show in the drawing. Because of this difficulty the latching arrangement is shown as having post 62 protruding from cross arm 24. Of course, any other suitable latch arrangement can be used.

The assembly must be held in the flying position because torsion springs 20 and 22 will pull the assembly into the normal position shown in FIG. 1*a* unless means are provided to keep it in the flying position. In the normal position torsion springs 20 and 22 are relaxed. When the heads are moved into the flying position, the springs are twisted because, as was described above, the ends of springs 20 and 22 are secured so that they cannot turn. Therefore, torsion springs 20 and 22 tend to hold the assembly in the normal position shown in FIG. 1*a*.

solenoid 58 and the latch arm 64 are operated by means of the circuitry shown in FIG. 6. When solenoid 58 is energized, the arm 60 pushes on cross arm 26 and moves the assembly into the flying position. Arm 60 momentarily strikes cross arm 26 with sufficient force to move the assembly and then the arm moves back to its normal position shown by dotted lines in FIG. 1. When the assembly moves to the flying position, arm 64 latches into the notch of post 62 and holds the assembly in the lying position. To move the assembly back to the normal position, arm 64 is retracted and the assembly springs back to the position shown in FIG. 1*a* due to the action of torsion springs 20 and 22. From the foregoing description of the structure and operation, it is apparent that the head mounting assembly can be likened to a pantograph.

Referring now to FIG. 6, a pair of terminals 84 and 86 are provided for applying 115 volts AC to the circuitry used to operate the transducer head mounting and to supply power to the drum motor 74. The circuit comprises three switches SW1, SW2, SW3, a drum speed sensor 72; a drum speed interlock 70; a solenoid 66 having a coil 80 and arm 64 previously mentioned; solenoid 58 having arm 60, these two components have also been previously mentioned; an amplifier 78; a tension sensitive resistance device 76 called a Pixie; an indicator lamp 82 and the terminals 90 and 92 used to provide remote indications of the status of the head mounting assembly.

Drum speed sensor 72 can be any known device that is capable of sensing the current change or voltage drop across the drum motor. The characteristics of a motor like a drum motor can be easily demonstrated by measuring the voltage drop across a ten ohm resistor connected in series with the field winding of the motor. This measurement was made using a typical drum motor and the following results were obtained: At zero speed the voltage drop was 12.0 volts; the voltage drop increased to a peak of approximately 12.5 volts at about 40 percent of full motor speed; then the voltage drop gradually decreased from 12.5 volts at the 40 percent speed to approximately 11.5 volts at about 90 percent of full motor speed; the voltage drop then decreases very rapidly to approximately 9 volts to 100 percent full motor speed. Thus, it is obvious that any well known device that can sense this rapid change in the motor characteric from 90 percent full motor speed to 100 percent full motor speed can be used for drum speed sensor 72. The drum motor is connected to terminal 84 of the 115 volt supply through drum speed sensor 72. The other terminal of the 115 volt supply, terminal 86, is connected to motor 74 through switch SW2.

Any other well known speed sensing device can also be used for speed sensor 72. Photoelectric, magnetic or mechanical tachometers can be used in a conventional manner. Another way in which the drum speed can be measured is to monitor the output signal from the head reading; the track containing the clock or sprocket signal that is typically recorded on the drum's surface in all digital magnetic drum applications. This signal could be applied to a frequency discriminator to give both over-speed and under-speed indications, if desired. In any event, it is obvious that speed sensor 72 can be any well known device capable of sensing the speed of the drum motor.

Drum speed interlock 70 is any device capable of responding to a voltage or current input. This device is connected to the output of speed sensor 72 and responds to an output signal from the speed sensor. As will be described, drum speed interlock 70 operates to being the transducer heads into the flying position when the drum has reached full speed.

The resistance device 76 known as a Pixie is a variable resistance whose resistance varies with the amount of tension placed on the device. The manner in which this device is mounted on the head mounting assembly is shown in FIG. 5. Pixie 76 is mounted against the side of head plate 42. First a thin shim 94 is secured to the side of head plate 42 by any suitable means such as epoxy cement. One end of Pixie 76 is then secured to shim 94 by means such as epoxy cement. A screw 96 is threaded through a threaded hole drilled into the side of front plate 32. Screw 96 is adjusted until Pixie 76 is under tension. As will be described later, Pixie 76 is used to detect loading of the transducer heads. Higher than normal loading will be placed on the transducer heads if the drum should slow down or if dirt or other foreign material accumulates on the recording surface of the drum or the transducer heads. Of course if for any reason the fluid bearing on which the heads are flying should fail, the loading on the heads will increase.

Now that the circuit of FIG. 6 has been described in general and some of the components have been described in detail, the operation of the circuit will be described. FIG. 6 shows the transducer head mounting assembly in the flying position. Initially, when the drum is not rotating and the transducer heads are in the non-flying position, SW1 is closed on the contacts 1*c* and 1*d*, switch SW2 is open, switch SW3 is open and arm 64 of solenoid 66 is retracted. To start the operation, switch SW3 is closed momentarily on the contacts 3*a* and 3*b*. The momentary closing of switch SW3 energizes coil 80 of solenoid 66 through Pixie 76 and amplifier 78 and arm 64 is locked into the position shown in FIG. 6. Amplifier 78 is used to amplify the output of Pixie 76. Solenoid 66 has a spring, not shown, inside the casing so that arm 64 when locked into the position shown in FIG. 6 will be spring locked rather than rigidly fixed into that position. When arm 64 is moved upward, switch SW2 is closed on contacts 2*a* and 2*b*. A dotted line is shown in FIG. 6 to indicate the interconnection between SW2 and solenoid 66. This interconnection is such that when arm 64 is moved outward from the solenoid casing switch SW2 is closed. By momentarily closing switch SW3 which in turn closes switch SW2 power is applied to drum motor 74. At this point, nothing else happens until drum motor 74 comes up to full speed. When the motor comes up to full speed, speed sensor 72 activates interlock 70 which in turn closes the circuit to solenoid 58 through diode 68. The other side of the solenoid is connected to terminal 84 through contacts 1*c* and 1*d* of switch SW1. Closing the circuit to solenoid 58 energizes this device thereby causing arm 60 to strike cross arm 26 moving the head mounting assembly into the flying position. Since arm 64 of solenoid 66 is locked into the extended position, the mounting assembly is held in the flying position because arm 64 engages the notch in post 62. When the head mounting assembly moves into the flying position, post 62 pushes switch SW1 such that contacts 1*c* and 1*d* are opened and contacts 1*a* and 1*b* are closed. Opening of contacts 1*c* and 1*d* opens the circuit to Ledex 58 and arm 60 retracts to the quiescent position. Therefore, as was mentioned above, arm 60 only momentarily strikes cross arm 26 to being the assembly into the flying position and then arm 60 moves away from the head mounting assembly. The closing of contacts 1*a* and 1*b* ignites lamp 82. Lamp 82 thus provides a visual indication that the transducer heads are in the flying position. Terminals 90 and 92 provide means for connecting indicating devices such as lamp, buzzers and the like remote from the apparatus. These remote devices can be so connected to give an indication that the heads are in the flying position or they can be so arranged in any well known manner to give an indication or warning that the heads have retracted from the flying position.

As long as the heads are operating properly, the circuit conditions will remain as described above and as shown in FIG. 6. If now for any reason the loading on the heads should increase, the tension on Pixie 76 will decrease thereby changing the resistance of this device which will cause amplifier 78 to cutoff or the output of the amplifier will decrease to the point where solenoid 66 is no longer energized. When solenoid 66 is deenergized, arm 64 is retracted from the notch in post 62 and the head mounting assembly will automatically retract away from the recording surface due to the action of torsion springs 20 and 22. The action of these springs has been previously described. When arm 64 is retracted, switch SW2 is pushed open due to the interconnection of these two devices. Therefore, all power is removed from the drum and the rest of the circuitry. Also when the head mounting assembly moves out of the flying position, switch SW1 is closed on contacts 1*c* and 1*d* thereby opening contacts 1*a* and 1*b*.

Switch SW4 which has not yet been mentioned is used to short out Pixie 76 and amplifier 78. At least initially when the assembly is first used it will be necessary to adjust the nuts or posts 46 and 48 and to properly position the whole assembly. Adjustments screws or the like, not shown in the drawing, can be provided to move the entire support assembly toward or away from the drum surface. The final fine adjustments should be made while the heads are in the flying position. If Pixie 76 remains in the circuit, the heads will be retracted if any contact of the heads with the drum surface is accidentaly made while making the final adjustments. During this adjustment it is not unlikely that such contact will take place. Therefore, with Pixie 76 in the circuit it would be very difficult to make these fine adjustments. Switch SW4 is closed during any adjustment period and reopened after the adjustments are made. Of course, switch SW4 could have a timing mechanism that would automatically open the switch after a set period of time so that this switch would not be accidentaly kept closed.

While load sensing device 76 has been specifically disclosed as being a strain-sensitive resistance known as a Pixie, it is obvious that any known device capable of sensing or measuring the loading on the transducer heads and capable of providing an output in response to abnormal loading on the heads can be used in place of a Pixie. For example, there are many different types of strain guages available that could be utilized in place of a Pixie. Also devices capable of sensing pressure on the head pad could also be used. In other words, the specific device utilized is not significant; the significant aspect is that the loading on the transducer heads is being sensed to provide a response that will cause the heads to retract under abnormal loading conditions.

From the foregoing description of operation it is apparent that our device is completely fail-safe. The heads cannot crash into the recording surface because Pixie 76 senses any unsafe loading on the heads and immediately retracts the heads away from the recording surface. This increased loading will occur, for example, if the drum slows down or if any foreign material accumulates on the drum or transducer heads or if a piece of grit gets on the heads or the recording surface or if for any reason the fluid bearing on which the heads are flying decreases below a safe level or disappears completely for any reason. Similarly, if the heads get too close to the recording surface, the loading on the heads will increase and the heads will be retracted. Also, if a power failure should occur, the heads will retract from the flying position since the power will be removed from the solenoid 66. This is extremely important since the drum does not immediately come to rest when the power is removed from the drum motor; however, the air bearing will decrease below a safe level as the drum speed decreases.

In addition to the fail-safe features of the invention another feature that may not be readily apparent from the drawing or the description should be noted. As was mentioned above, the head mounting assembly is a pantograph type mechanism. With this type of mechanism the plane of the heads never changes when the heads approach or move away from the drum. Therefore, the heads are able to track the contour of the drum while maintaining an optimized relationship to the drum surface. The prior art flying head mounting assemblies move the transducer face in an arc,and therefore there is only one position at which the head is really in its optimum relationship to the drum surface. This feature of our invention is a highly desirable one particularly from the standpoint of initial assembly and adjustment.

While we have described our invention with reference to a particular embodiment, it will be apparent to those skilled in the art that various modifications and changes can be made to the described embodiment without departing from the spirit and scope of the invention.

We claim:

1. A flying head transducer assembly for removably holding a magnetic head in close but non-contacting relationship to the recording surface of a moving data storage device comprising: a support structure held by arms positioned in a generally rigid pattern; means to mount a magnetic transducer head on said support; pressure load responsive means mounted on said support so as to be in locations corresponding to locations of said transducer head and adapted and arranged to create a signal at a predetermined high pressure between itself and said recording surfaces; means to maintain said transducer head away from, in a non-flying state, said recording surface; means to move said support to move said transducer head in close proximity, in the flying state, to said recording surface; means to hold said transducer head in said flying state and means responsive to said signal from said pressure responsive means to disable said means to hold and to move said support away from said recording surface.

2 An assembly as defined in claim 1 wherein said support is rectangular and comprised: a front plate; a back plate; first, second, third and fourth cross arms connecting said front plate to said back plate in such a manner that said front plate is movable with respect to said back plate.

3 An assembly as defined in claim 2 wherein said front plate has a rectangular slot cut out of the center thereof and said means to mount said transducer heads includes a head pad resiliently mounted in said rectangular slot.

4 An assembly as defined in claim 3 wherein said head pad has a rectangular slot for receiving wires from said transducer heads.

5 An assembly as defined in claim 4 wherein an adjustable differential spring assembly is provided to resiliently mount said head pad in said rectangular slot.

6 A flying head transducer assembly for removably holding a magnetic head in close but non-contacting relationship to the recording surface of a moving data storage device comprising: a generally rectangular shaped support structure comprising a front plate; a back plate; first, second, third and fourth cross arms connecting said front plate to said back plate in such a manner that said front plate is movable with respect to said back plate; means to mount a magnetic transducer head on said support; means to maintain said transducer head away from, in a non-flying state, said recording surface; means to move said transducer head in close proximity, in the flying state, to said recording surface; and means to hold said transducer head in said flying state; said means to hold said transducer head in said non-flying state including a first torsion rod passing through one side of said back plate, said first torsion rod being secured at one end in said first cross arm and at its other end in the bottom edge of said back plate; and a second torsion rod passing through the other side of said back plate, said second torsion rod being secured at one end in said second cross arm and at its other end in the bottom edge of said back plate.

7. An assembly as defined in claim 6 wherein said means to move said transducer heads into said flying state is electrically controlled.

8. An assembly as defined in claim 7 wherein said means to hold said transducer heads in said flying state includes an electrically controlled latch arrangement.

9. A flying transducer head assembly comprising: a pantograph type structure having at least one transducer head mounted thereon; and means for holding said head in the non-flying position wherein fail-safe means are provided to prevent said transducer heads from contacting said recording surface when said heads are in said flying state said fail-safe means, said means to move said heads into said flying state and said means for holding said heads in said flying state comprising: a first switch having first and second contacts; a second switch having first and second contacts; means to connect said first contact of said first switch to said first contact of said second switch; means to connect said second contact of said second switch to said second contact of said first switch; first and second terminals connected to a source of voltage; means to connect said first terminal to said first contacts of said second switch; an amplifier having an input and an output; a tension sensitive resistance connected between said amplifier input and said second contact of said second switch; a solenoid having a movable arm and a coil connected between said amplifier output and said second terminal; a sensor to sense the speed of rotation of said data storage device, said data storage device being driven by a motor having first and second power input terminal; means to connect said sensor between said second contact of said second switch and said first motor input terminal; means to connect said second motor input terminal to said second terminal; an interlock device; a diode having a cathode and an anode; means to connect said interlock device between said sensor and the cathode of said diode, a second solenoid type device having an arm; a third switch having first, second,third and fourth contacts; means to connect said second solenoid type device between said first contact of said third switch and the anode of said diode; means to connect said second contact of said third switch to said second terminal; means to connect said third contact of said third switch to said second contact of said second switch; indicating means connected between said fourth contact of said third switch and said second terminal; means coupling said second switch and said solenoid such that said first and second contacts of said second switch are electrically connected when said solenoid is energized and disconnected when said solenoid is deenergized; means integral with said support structure for engaging said arm of said first solenoid when said heads are in said flying position and said solenoid is energized; and means for connecting said third contact of said third switch to said fourth contact of said third switch when said heads are in said flying position and for connecting said first contact of said third switch to said second contact of said third switch when said heads are in the non-flying position.

10. An electronic circuit for selectively positioning magnetic transducer heads in close proximity to a moving recording surface and for removing said magnetic transducers away from said recording surface comprising: means to sense the speed of said moving recording surface and produce an output when said moving recording surface has reached a predetermined speed; means responsive to said output from said speed sensing means to cause said transducer heads to move into close proximity to said recording surface only when said moving recording surface has reached said predetermined speed; means for sensing the pressure loading on said transducer heads when said transducer heads are in close proximity to said recording surface, said means for sensing loading being mounted so as to be in locations corresponding to locations of said transducer heads, and means responsive to said load sensing means for automatically moving said transducer heads away from said close proximity to said recording surface when said loading on said heads exceeds a predetermined safe level and wherein means are provided to selectively short out said load sensing means.

11. A flying transducer head assembly comprising: a pantograph type structure comprised of pivoted arms having at least one transducer head mount thereon; and means for holding said head in the non-flying position, wherein said pantograph type structure comprises a back plate, a front plate having a movable transducer head pad mounted thereon, two movable upper cross arms connected between said front and back plates and two movable lower cross arms connected between said front and back plates.

* * * * *